United States Patent [19]
Bales et al.

[11] Patent Number: 5,014,266
[45] Date of Patent: May 7, 1991

[54] CIRCUIT SWITCHING SYSTEM FOR INTERCONNECTING LOGICAL LINKS BETWEEN PACKET SWITCHING NETWORKS

[75] Inventors: Bruce M. Bales, Louisville; Paul E. Miller, Northglenn, both of Colo.

[73] Assignee: AT&T Bell Laboratories, Murray Hill, N.J.

[21] Appl. No.: 544,083

[22] Filed: Jun. 26, 1990

Related U.S. Application Data

[63] Continuation of Ser. No. 290,930, Dec. 28, 1988, abandoned.

[51] Int. Cl.$^5$ ............... H04Q 11/04; H04M 11/00
[52] U.S. Cl. .................... 370/60.1; 370/58.1; 370/60; 370/62; 370/68.1; 370/110.1; 379/94; 379/201
[58] Field of Search ............... 370/53, 58.1, 58.2, 370/58.3, 60, 60.1, 62, 68.1, 85.1, 85.9, 85.11, 94.1, 110.1; 379/93, 94, 201, 90, 212, 215, 219, 220, 221, 258, 268, 272

[56] References Cited
U.S. PATENT DOCUMENTS

| 4,539,676 | 9/1985 | Lucas .................... 370/60 |
| 4,592,048 | 5/1986 | Beckner et al. ............ 370/110.1 |
| 4,656,623 | 4/1987 | Dalby et al. ............... 379/94 |
| 4,707,694 | 11/1987 | Bauer et al. .............. 370/94 |
| 4,720,850 | 1/1988 | Oberlander et al. .......... 370/62 |
| 4,723,238 | 2/1988 | Isreal et al. .............. 370/60 |
| 4,723,272 | 2/1988 | Maat ..................... 370/62 |
| 4,736,364 | 4/1988 | Basso et al. .............. 370/68.1 |
| 4,764,919 | 8/1988 | Hunter et al. ............. 370/94 |
| 4,821,259 | 4/1989 | DeBruler et al. ............ 370/60 |

FOREIGN PATENT DOCUMENTS

| 0024617 | 3/1981 | European Pat. Off. ........ 370/62 |
| 2091068 | 7/1982 | United Kingdom ........... 370/62 |

OTHER PUBLICATIONS

Martin H. Weik, "Communications Standard Dictionary", p. 523, Van Nostrand Reinhold Company.
International Telegraph and Telephone Consultative Committee (CCITT), IXth Plenary Assembly, Melbourne, 1988, Document AP IX-123-E, Jun. 1988, pp. 10-178.
International Telegraph and Telephone Consultative Committee (CCITT), IXth Plenary Assembly, Melbourne, 1988, Document AP IX-124-E, Jun. 1988, pp. 1-86.
International Telegraph and Telephone Consultative Committee (CCITT), IXth Plenary Assembly, Melbourne, 1988, Document AP IX-125-E, Jun. 1988, pp. 1-79.

Primary Examiner—Douglas W. Olms
Assistant Examiner—Alpus H. Hsu
Attorney, Agent, or Firm—John C. Moran

[57] ABSTRACT

A circuit switching system for interconnecting end point systems, such as packet switches, compressed voice concentrators, or data multiplexers, by allowing multiple logical links on each logical channel. The circuit switching system is connected to the end point system by a number of communication facilities with each facility having a plurality of logical channels. For packet switches, the circuit switching system is responsive to a first request to establish a first logical link on a logical channel to a packet switch and is responsive to a second request for another logical link to that packet switch to establish a second logical link on the same logical channel. The circuit switching system is responsive to a third request for establishing a logical link to another packet switch on the same logical channel for denying this request and for negotiating another logical channel.

17 Claims, 14 Drawing Sheets

ISDN SOFTWARE STRUCTURE

L2-L3 MESSAGE I/O 301

Q.931 MESSAGE HANDLING 302

MESSAGES PROCESSING 303

CALL HANDLER 304

L2-L3 PRIMITIVE PROCESSING 309

RESOURCE MANAGEMENT HANDLER 311

TIMING 310

IDLE STATE

CALLUP STATE 1402

CALLUP STATE 1402

CALLUP STATE 1402

ACTIVE STATE 1403

CIRCUIT SWITCHING SYSTEM FOR INTERCONNECTING LOGICAL LINKS BETWEEN PACKET SWITCHING NETWORKS

This application is a continuation of application Ser. No. 07/290,930 filed on 12/22/88, now abandoned.

TECHNICAL FIELD

This invention relates to packet and circuit switching and, in particular, to a circuit switching system that has the capability of setting up multiple logical links, compressed voice calls and subrate data calls on one logical channel between packet switching networks, voice concentrators, and data multiplexers by responding to a switching protocol.

BACKGROUND OF THE INVENTION

Communication between packet switching networks is done by establishing a logical channel between two packet switching networks and then using logical links within this logical channel to establish communication between digital terminals attached to both packet switching networks. Each pair of digital terminals communicating through the packet switching networks has one logical link assigned to them. This logical link timeshares with other logical links on the logical channel. ISDN standard Q.931 defines the packet protocol which is utilized by packet switching networks to establish multiple links over the same logical channel. The result is that there can be a number of packet calls between pairs of digital terminals sharing the same logical channel. A circuit switching system establishes one logical channel for each voice or data call which it is currently switching. The reason for this is that a common bandwidth voice call cannot share a logical channel with other voice calls because of the amount of bandwidth required for a voice call. ISDN standard Q.931 defines the protocol which is used by circuit switching systems to establish logical channels through a network made up of a number of circuit switching systems.

The problem that arises is when it becomes desirable to interconnect two packet switching networks with a circuit switching system. The problem is that a circuit switching system only allows one call per channel according to the ISDN standard and does not recognize requests for logical links on a logical channel. When the packet switching network needs a logical link the circuit switching system will assign this logical link to a logical channel; and upon a second request for another logical link via the same logical channel, the circuit switching system denies the second request. The second request for a logical channel is a request for a second call. The end result is that a great deal of bandwidth is wasted when using a circuit switching system to interconnect packet switching systems.

Whereas it is possible to have systems made up entirely of packet switching networks, the large embedded base of circuit switching networks in both private communication systems and in the public telephone network make this a crucial problem.

A similar problem exists with respect to subrate data calls. In sutrate data, two data multiplexers multiplex a logical channel into time slots and, then, place data calls in those time slots. Data calls are established by one data multiplexer requesting the establishment of a data call. Voice concentrators function in a similar manner by placing compressed voice calls in time slots of a logical channel. A circuit switch interposed between either data multiplexers or voice concentrators establishes a logical channel for each request. The result is that each compressed voice or subrate data call still requires an individual logical channel.

SUMMARY OF THE INVENTION

The problem in the art is solved and a departure is achieved by an apparatus and method that allow a circuit switching system to establish a plurality of logical links within the same logical channel between two packet capable endpoints such as two packet switching networks. Advantageously, the circuit switching system establishes a plurality of compressed voice calls within the same logical channel between voice concentrators and establishes a plurality of subrate data calls within the same logical channel between data multiplexers. Further, the circuit switching system responds to the packet protocol both in setting up logical links and channels and in determining the destination of the logical link. In addition, utilizing same packet protocol as packet switching systems, the circuit switching system signals the packet switching systems. Also, the circuit switching system responds to compressed voice and subrate data protocols in setting up the compressed voice calls and subrate data calls, respectively.

Advantageously, the circuit switching system is interconnected to the packet capable end points, voice concentrators, and data multiplexers by trunk facilities. Each of the trunk facilities has a number of logical channels and at least one signaling channel. The requests for the establishment of calls and links are made via the signaling channel.

Advantageously, the circuit switching system may comprise a plurality of interconnected circuit switching networks each of which is responsive to requests for the establishment of multiple logical links, compressed voice calls, or subrate data calls within a logical channel to process those requests and to forward those requests to the next circuit switching network or other endpoint systems upon entrance from the circuit switching system.

The method interconnects a plurality of packet capable end points systems connected by trunk facilities to a circuit switching system by performing the steps of connecting a first packet capable end point system to a second via a logical channel in response to a setup request for a logical link from the first, signaling the second end point system that a second logical link is being established via the channel in response to a second setup request from the first end point system for a second logical link to the second end point system, denying a setup request from the first end point system for a logical link in the same channel to a third end point system.

DETAILED DESCRIPTION

Figure 1:
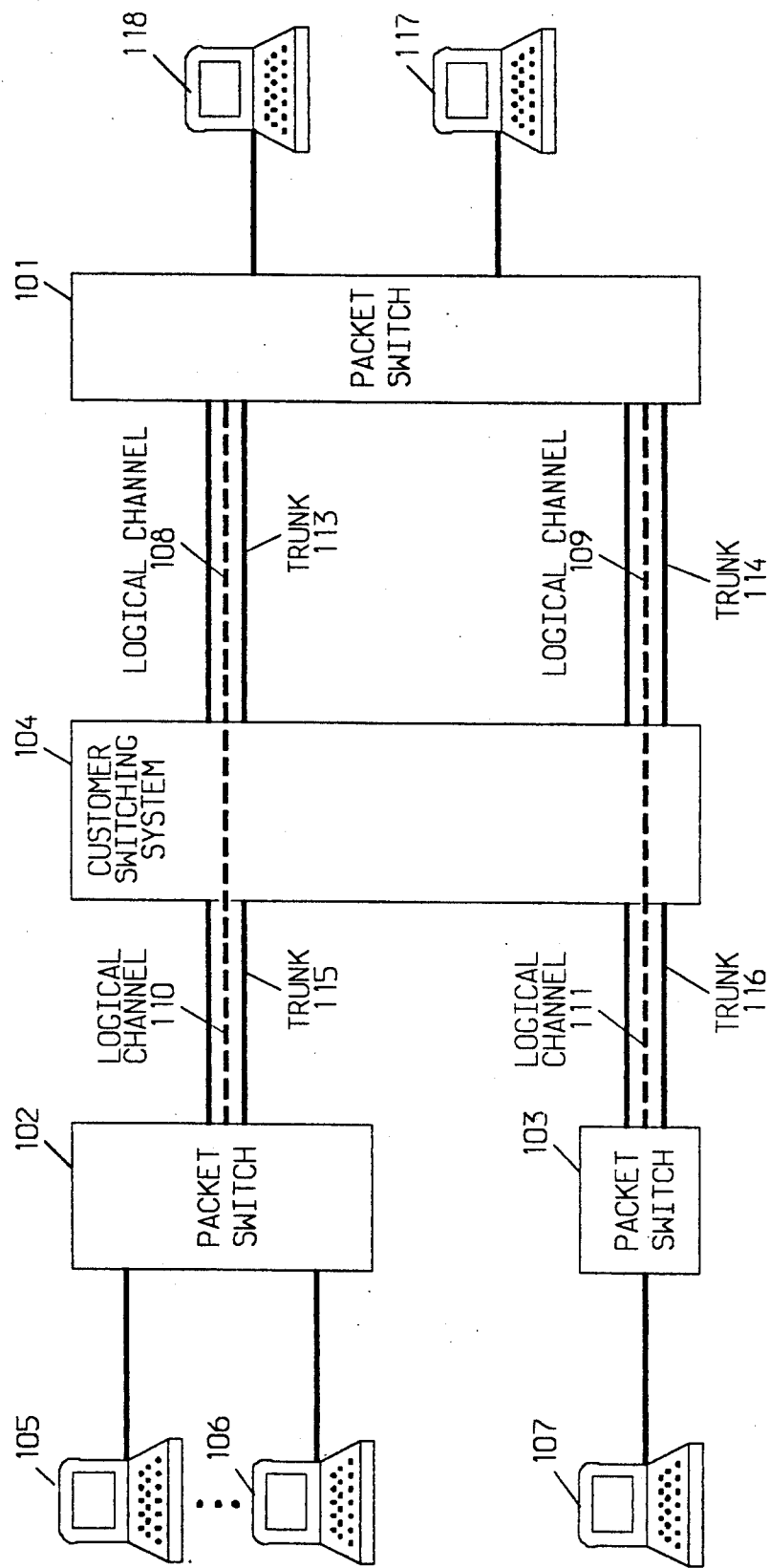
FIG. 1 illustrates, in block diagram form, the inventive concept.

In block diagram form, FIG. 1 illustrates, a circuit switch, customer switching system 104, for performing the switching of packetized data, compressed voice data, or subrate data (also referred to as logical calls) which is the subject of this invention. For illustration purposes, in FIG. 1, only packet switches are interconnected to system 104. However, any combination of packet switches, voice concentrators or data multiplexers could be interconnected to system 104. The latter system processes requests from packet switches, voice concentrators, or data multiplexers in a similar manner. The type of requesting endpoint system is indicated in ISDN protocol level 3 messages in the bearer capability field. Customer switching system 104 is responsive to request from packet switches 102, 102, and 103 to establish multiple logical links in each logical channel for which customer switching system 104 is interconnected with those packet switches. Packet switches are illustrated in FIG. 1; however, it would be obvious to one skilled in the art that one or more of those switches could be replaced by other types of packet capable endpoints such as computers or ISDN terminals. Customer switching system 104 and the packet switches are physically interconnected by ISDN primary rate interface (PRI) trunks each having advantageously 23 logical channels (B channels) and 1 control channel (D channel). Each channel having a transmission capacity of 64 Kbs. The terminals are physically interconnected to the packet switches by ISDN basic rate interface (BRI) lines each having two 64 Kbs channels plus an 8 Kbs control channel. Each logical channel can have a plurality of logical links with each logical link communication data for an individual data call. Further, system 104 can directly terminate BRI lines and establish logical links in either of the two logical channels of each BRI line.

For a packet switch to establish communication with a terminal attached to another packet switch, the packet switch transmits a request to customer switching system 104 via a first logical channel requesting that a logical link within the first logical channel be used to establish communication. Customer switching system 104 can be handling the first logical channel in one of three ways. First, the first logical channel may be already interconnected to a second logical channel which in turn is connected to the other packet switch. Second, the first channel may be idle. Third, the first channel may be interconnected to a third channel which is connected to a third packet switch.

If the first logical channel is presently being switched to the other packet switch via the second logical channel, customer switching system 104 establishes the communication via the second logical channel. If the first logical channel is idle, customer switching system 104 establishes a connection via a second channel which had been previously idle to the other packet switch and internally connects the two logical channels together. After connecting the two logical channels, customer switching system 104 establishes the communication. In the third case, customer switching system 104 refuses the request to setup a logical link on the first channel and negotiates with the first packet switch for a different channel.

For example, if terminal 118 request that communication be established between terminal 105 and itself, packet switch 101 transmits a request to establish a logic link to terminal 105 via customer switching system 104. The latter system establishes a logic link on logical channel 108 and sends a message to packet switch 102 via the D channel associated with logical channel 110 requesting the establishment of a second logic link between customer switching system 104 and packet switch 102. The latter packet switch in turn establishes a third logic link to terminal 105.

Further, if terminal 117 requests a connection to terminal 106, packet switch 101 requests that communication be established via customer switching system 104 using a fourth logical link which would be in logical channel 108. Customer switching system 104 then requests a fifth logical link in logical channel 110 to packet switch 102 so that communication can be established via packet switch 102 to terminal 106.

However, if terminal 117 requests that communication be established with terminal 107, customer switching system 104 refuses the request from packet switch 101 to establish this communication via a logical link in logical channel 108. Customer switching system then transmits back a message suggesting a different logical channel such as logical channel 109. If packet switch 101 accepts the suggested logical channel, customer switching system 104 requests a logical link on logical channel 111 to packet switch 103 so as to establish communication with terminal 107. Once packet switch 103 grants this request, customer switching system 104 internally interconnects logical channels 109 and 111. By connecting the two logical channels, customer switching system 104 establishes communication.

Each data call being handled by customer switching system 104 has two distinct halves. Each half of the data call may be in one of the four states illustrated in FIG. 14. All of the possible multiple logical links are considered to be in idle state 1401 of FIG. 14 if not in one of the other states. When packet switch 101 transmits the initial request to customer switching system 104, a logical link is created and linked into the other logical links presently on logical channel 108. In addition, a logical link for the second half of the call is created on logical channel 110 to packet switch 102. In addition, a setup request is transmitted to packet switch 102. Now, both halves of the call enter callup state 1402 of FIG. 14 via path 1407. In the latter state, customer switching system 104 waits until a response is received from packet switch 102 acknowledging the setup request.

When packet switch 102 starts to alert terminal 105, it transmits to customer switching system 104 an alert indication message which customer switching system 104 retransmits to packet switch 101. In addition, during the callup state, different progress indications can be transmitted from packet switch 102 back to packet switch 101 via customer switching system 104. One such progress indication would indicate that packet switch 102 had to leave the ISDN network (e.g. via a modem) to communicate with terminal 105.

Once packet switch 102 has made the connection to terminal 105, it transmits back a connection indication to customer switching system 104. This message causes customer switching system 104 to transfer the second half of the call into active state 1403 via path 1412. Customer switching system 104 also retransmits the connection message to packet switch 101 via the D channel associated with logical channel 108 and places the first half of the call in active state 1403 via path 1412.

During the callup state 1402, if packet switch 101 abandons the call either because the ISDN protocol is out of step between packet switch 101 and customer switching system 104 or because terminal 108 disconnected, etc., the first half of the call transfers to idle state 1401 via path 1409. The second half of the call transfers to the calldown state 1404 via path 1413. In this state, the second half of the call transmits the proper disconnect messages to packet switch 102; and when an acknowledgement is received back from packet switch 102 to that disconnect message, the second half of the call transfers to idle state 1401 via path 1410.

While in active state 1403, the first half of the call is responsive to a disconnect message from packet switch 101 to enter the idle state 1401 via path 1408 and in so doing places the second half of the call in calldown state 1404 via path 1414. If packet switch 102 sends the disconnect message, then the second half of the call immediately goes to the idle state and the first half of the call goes to the calldown state.

Figure 2:
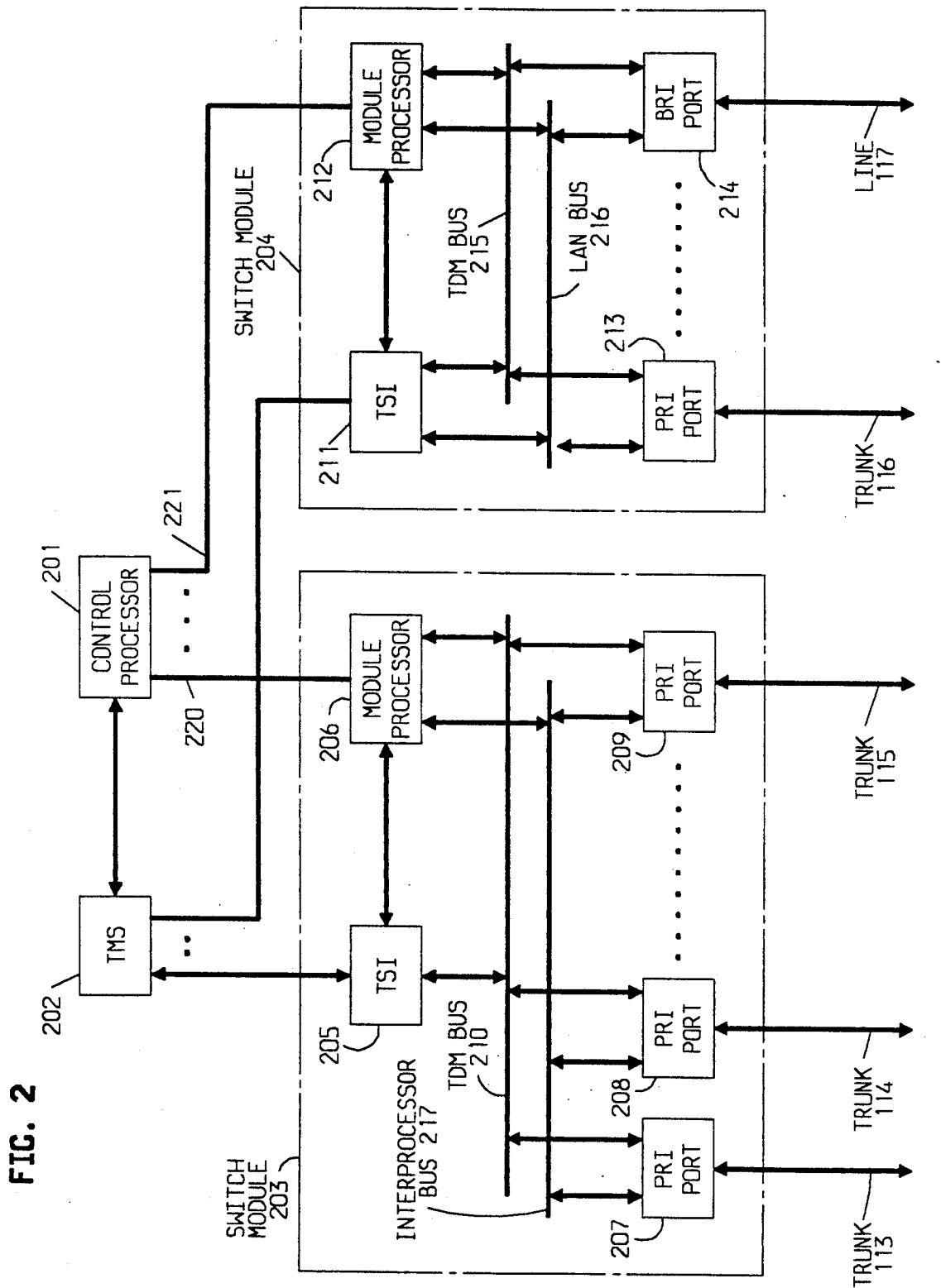
FIG. 2 illustrates a business communication system for practicing the illustrative invention.

Customer switching system 104 is illustrated in greater detail in FIG. 2. Customer switching system 104 comprises switch modules 203 through 204 time matrix switch (TMS) 202 and control processor 201. Each switch module is illustrated as terminating a plurality of ISDN PRI trunks or BRI lines. Each switch module routes all intra-module calls within itself; whereas, inter-module calls must be routed through TMS 202.

The data received from the PRI trunks within switch module 203 is interconnected via time division multiplex (TDM) bus 210 with each channel being assigned a time slot for receiving data and a time for transmitting data on bus 210 and all time slots are switched through time slot interchange (TSI) 205. In the present example, the data of logical channel 108 is received by port 207 and communicated via TDM bus 210 and TSI 205 to port 209 where it is transmitted as logical channel 110. The data of logical channel 109 is communicated via trunk 114 and is communicated to logical channel 111 which is communicated on trunk 116. The communication of data between channel 109 and channel 111 is via port 208, TDM bus 210, TSI 205, TMS 202, TSI 211, TDM bus 215 and port 213. The functions performed by the TDM buses, TSI 205 and TMS 202 are well-known in the art.

Switch module 204 functions in a different manner than switch module 203. Channels communicated within switch module 204 do not have to be switched through TSI 211 but can be switched directly on TDM bus 215. TSI 211 is only used for inter-module calls.

ISDN messages are transmitted via the PRI trunks in the 24th channel on D-channel. Within switch module 203, the messages associated with logical channel 108 are received via the 24th channel of trunk 113 and are terminated at ISDN level 2 by PRI port 207. Interlevel communication messages designated as L2–L3 primitive are then transferred via interprocessor bus 217 to module processor 206. ISDN messages associated with logical channel 111 are communicated in the 24th channel of trunk 116. These messages are transferred via LAN bus 216 to module processor 212. LAN bus 216 is not used for packet switching. The latter processor terminates level 2 before transferring the L2–L3 primitive messages via datalink 221 to control processor 201.

Customer switching system 104 can also terminate a variety of standard analog telephones and trunks and also digital telephones and terminals utilizing the AT&T DCP protocol. Such telephones and terminals are not illustrated in FIG. 2.

Figure 3:
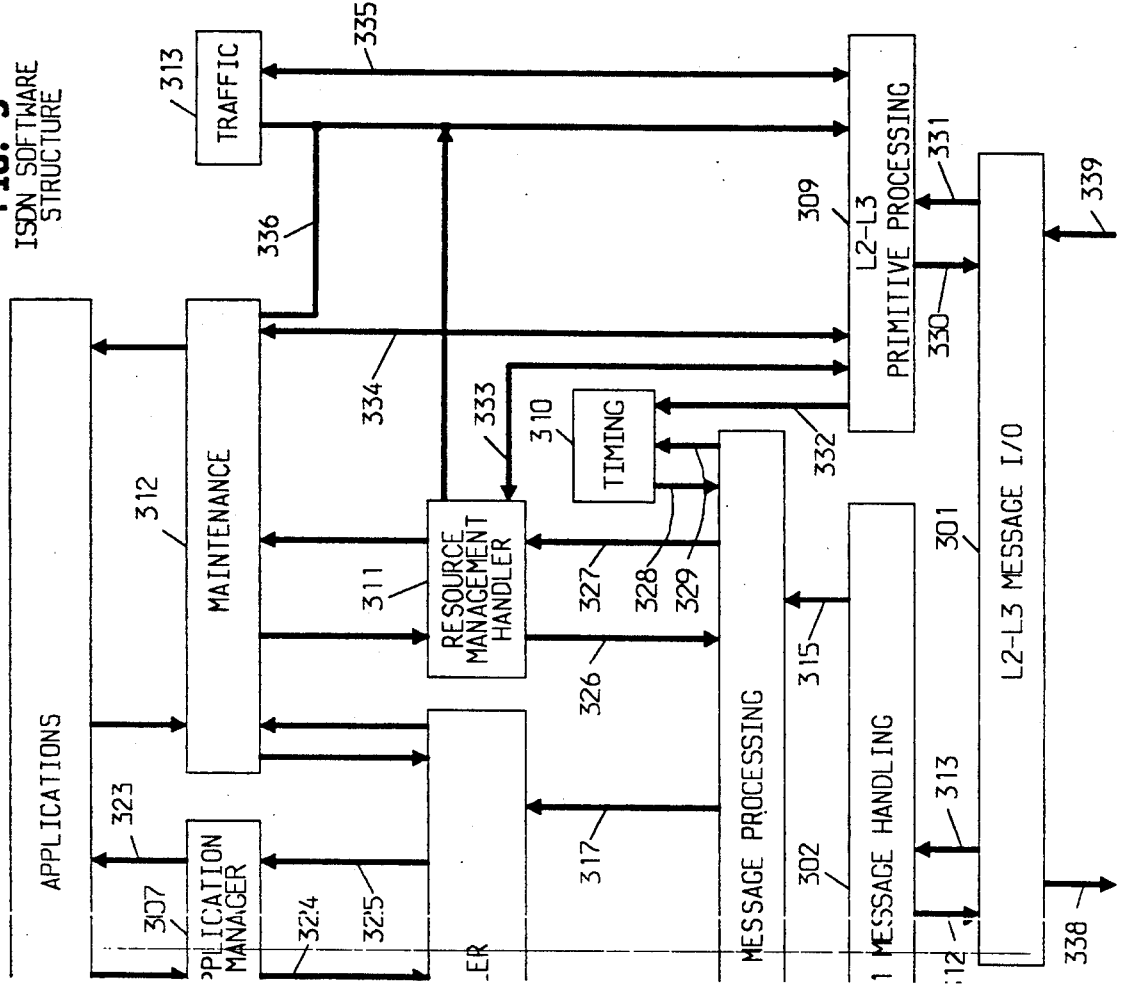
FIG. 3 illustrates the ISDN software structure used to control the system of FIG. 2.
Figure 11:
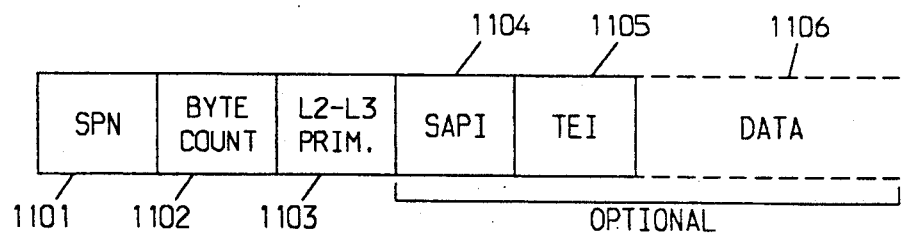
FIG. 11 illustrates the format of L2-L3 primitive packets.

FIG. 3 illustrates the ISDN software structure that is implemented by control processor 201. The non-ISDN functions performed by control processor 201 and low-level functions performed by the module processors are not shown; however, circuit call processing block 305 and maintenance block 312, which are executed by control processor 201, include the call processing and maintenance for the non-ISDN functions. In general, blocks 304 through 306 are concerned with the management of voice and data calls whereas blocks 309 through 313 are concerned with the maintenance and resource management tasks. Blocks 307 and 308 are utilized by high level applications. The software architecture of FIG. 3 receives messages which are transmitted from level two via input and output paths 338 and 339. The format of these messages is illustrated in FIG. 11, and further details on level two and level three messages may be found in AT&T Technical Publication Number 41449 and Addendum 41459. L2–L3 message I/O block 301 receives information from path 311. The primitives on paths 338 and 339 are defined by field 1103 of FIG. 11. Block 301 is responsible for handling all L2–L3 information to and from a module. After handling these messages, block 301 transfers all of the received L2–L3 primitives that indicate a Q.931 message, which is the DL_DATA_INDICATION, to Q.931 message handling block 302 for processing. All other L2–L3 primitives received by block 301 are transferred to block 309 for processing.

Q.931 message handling block 302 is responsible for verifying and creating all Q.931 messages. Block 302 interfaces with L2–L3 message I/O 301 by receiving and sending all of the DL_DATA_INDICATION primitives which contain incoming or outgoing Q.931 messages. Q.931 message handling communicates with Q.931 message processing 303 by passing either a verified Q.931 message or receiving a request to build a Q.931 message.

Q.931 message processing 303 provides the control of the Q.931 operation and does this by maintaining state tables which define the state of the Q.931 message protocol for each Q.931 channel which has been established or is being established within any module of system 200 of FIG. 2. Q.931 message processing 303 negotiates the establishment of Q.931 channels, supervises their activity and eventually releases them. Block 303 communicates with call handler 304, resource management handler 311, and timing block 310.

Call handler 304 is utilized to provide an interface for the Q.931 messages being communicated between block 303 and circuit call processing 305, multilink 306, application manager 307, and maintenance 312. Circuit call processing 305 is responsive to analog telephone and trunk like stimulus to provide the overall call processing functions. Call handler 304 is responsive to the Q.931 message processing 303 to convert the Q.931 messages into analog telephone and trunk like stimulus to be passed to circuit call processing block 305.

Timing block 310 provides all the necessary software timers for block 303. Resource management handler 311 is responsible for controlling the service status of circuits and the link status of level two. Maintenance 312 performs the normal maintenance type tasks for the ISDN portion of system 104. Traffic block 313 performs the standard traffic measurement type functions.

Figure 4:
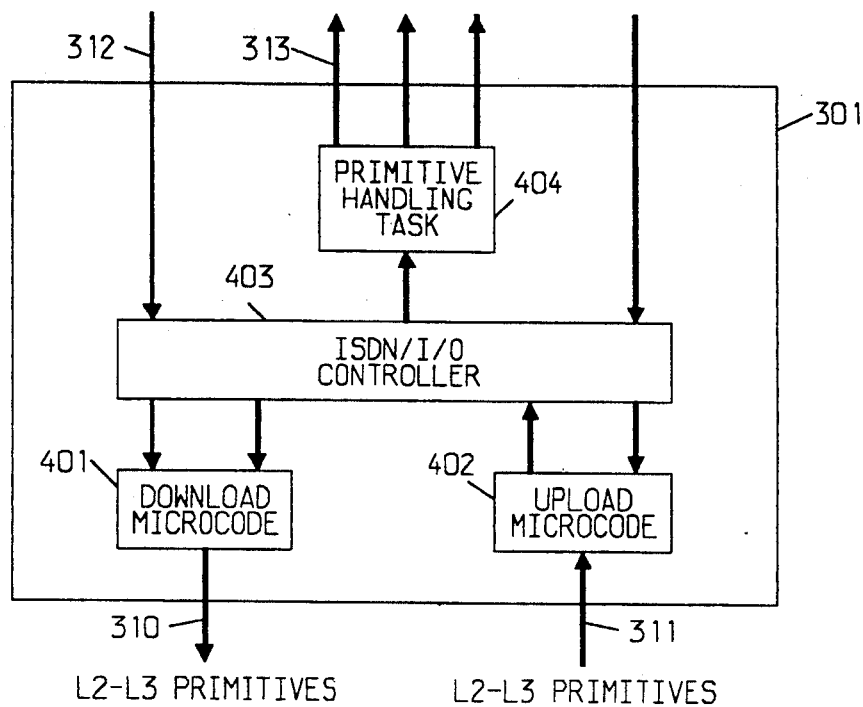
FIG. 4 illustrates, in block diagram form, the L2-L3 message I/O 301 of FIG. 3.
Figure 5:
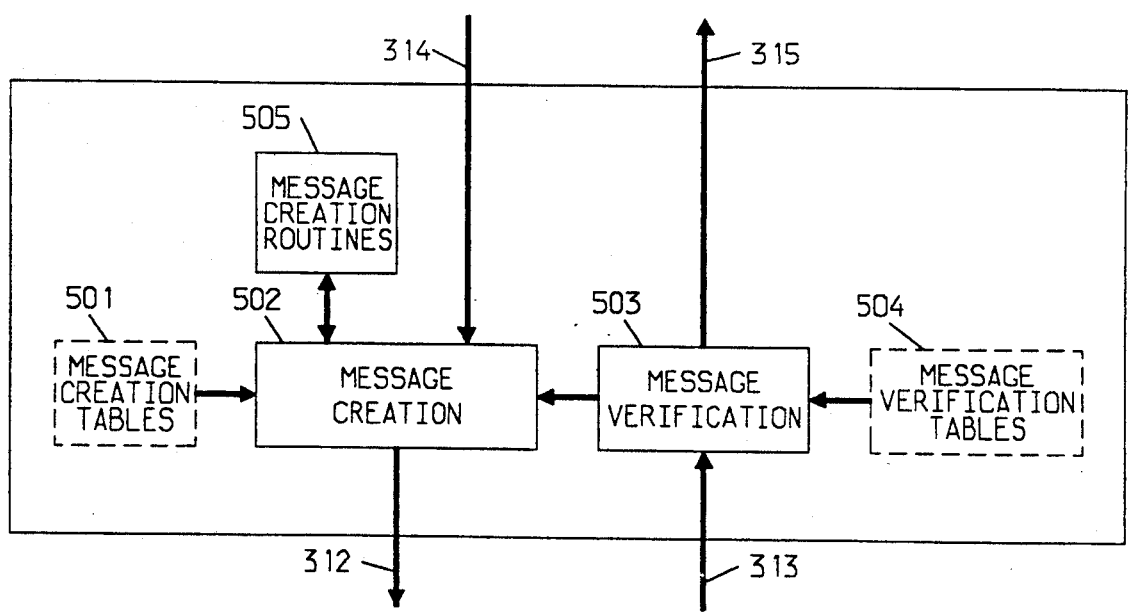
FIG. 5 illustrates, in block diagram form, Q.931 message handling 302 of FIG. 3.

L2-L3 message I/O block 301 is illustrated in greater detail in FIG. 4. ISDN I/O controller block 403 is a task which runs every ten milliseconds on control processor 201 and is responsible for moving all of the ISDN information in and out of control processor 201. Controller 403 functions by calling microcode routines 401 and 402 to move information into and out of a queue of input message buffers and a queue of output message buffers, respectively. The input into controller 403 is an L2-L3 primitive, DL_DATA_REQUEST primitive, received from message handling block 302 via path 312. This primitive is passed to controller 403 along with a message buffer. All messages received from level two by block 301 are passed from controller 403 to primitive handling task 404. Primitive handling task 404 is also run every ten milliseconds and is used to process all of the L2-L3 primitives. Primitive handling task 404 handles these primitives in one of two ways, either control is passed to a routine specified for that primitive in blocks 302 or 309 which is done for primitives requiring immediate attention or the primitive and related information are stored in a queue which is specific for that primitive and which is then passed to block 309. The storing of the primitive and related information is done for tasks which may be performed at a later time. Such tasks include maintenance and traffic type operations. When primitive handling task 404 directly passes control to a routine, for example in message handling block 302 to process a primitive, it is passing control of control processor 201 and that control is returned by the receiving routine to primitive handling task 404 once the routine has finished executing.

Q.931 message handling block 302 is responsible for verifying and creating all Q.931 messages. Block 302 interfaces with message I/O block 301 via paths 312 and 313 by receiving DL_DATA_INDICATION and sending DL_DATA_REQUEST primitives containing an incoming or outgoing Q.931 message, respectively. Block 302 communicates with Q.931 message processing block 303 via paths 314 and 315 by passing either a verified Q.931 message or receiving a request to build a Q.931 message. Message verification block 503 receives control from message I/O block 301 when a Q.931 message has been received and needs to be verified. Block 503 parses the message and checks for any message format error and verifies that all the mandatory information is included based on the specifications as published in the aforementioned AT&T Technical Publication. All of the information needed to check the received message is contained in message verification tables 504. The message is parsed by storing pointers into the buffer containing the message that point to the different types of information in the message. Messages that are successfully parsed are passed to message processing block 303 via path 315. Message verification block 503 is responsive to two different types of errors in received messages. Certain types of errors are simply logged in a general area utilized to log errors which will be processed later if necessary. Such erors would result, for example, if a message came that was simply incomplete. The other type of message error is where the message is complete but specifies a logical entity that did not exist, for example, referring to a call that does not exist. Such an error requires an immediate response, and message verification block 503 transmits a request to message creation block 502 to transmit a message to the sender of the message in error giving the status of the received message and a code specifying what the error was.

Message creation block 502 receives requests to build a message from either message verification block 503 or Q.931 message processing block 303. Block 502 provides the control for properly creating a message. All of the information elements included in a message are created by individual routines contained in message creation routines block 505. Information for building each type of message is contained in message creation tables 501. Message creation block 502 builds a requested message by generating the proper message information using the routines in message creation routines block 505. Each of these routines is invoked by block 502 for a specific information element (IE), and each IE routine contains all of the information on whether an IE should be created for a given situation and all of the rules on what information goes in the IE.

Figure 6:
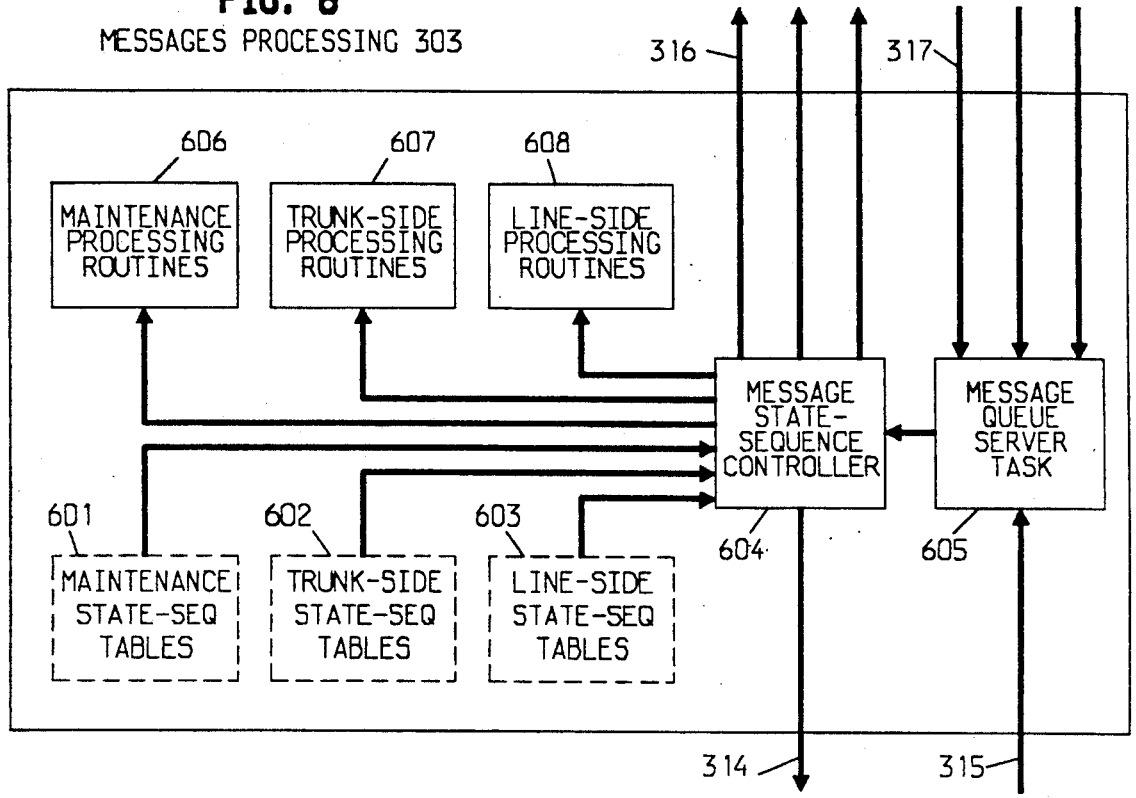
FIG. 6 illustrates, in block diagram form, message processing 303 of FIG. 3.

Q.931 message processing block 303 is illustrated in greater detail in FIG. 6. Block 303 is responsible for allowing system 104 to communicate with other data equipment at the peer level of Q.931 and is responsible for such functions as establishing peer type communication at Q.931, maintaining this communication, and releasing such communication when necessary. Message processing block 303 also maintains a set of tables which define the status, call type, and used facility for all level 3 links for both circuit and data calls.

The processing performed by block 303 is classified as maintenance, trunk-side, and line-side processing. The trunk-side and line-side processing are used to map call stimulus received in Q.931 messages into the call control message which can be used by circuit call processing block 305. The maintenance processing is used to handle all messages that apply to the "null" or "global" call reference values for both lines and trunks. A "null" reference value indicates that the message is not associated with any call. Whereas, a "global" reference value indicates it is associated with all calls on the receiving BRI or PRI interface.

Message queue server task 604 is a task which is run every ten milliseconds on each module processor and checks to see if there is nay work for block 303 in the form of incoming messages from blocks 304, 311, or 310. The incoming messages are left in message queues by the latter blocks. In addition, it looks for messages coming from Q.931 message handling block 302. Queue server task 605 is responsive to those messages to interpret the work to be done and to convert that work into state-stimulus information and to determine the state table and specific call record to which the work applies. After doing that, message queue server task 605 then activates message state sequence controller 604 to process the state and stimulus information using routines 606, 607, and 608 with the state-sequence information coming from tables 601, 602, and 603. The processed information is transferred to blocks 302, 304, 310, or 311 in message queues.

Figure 7:
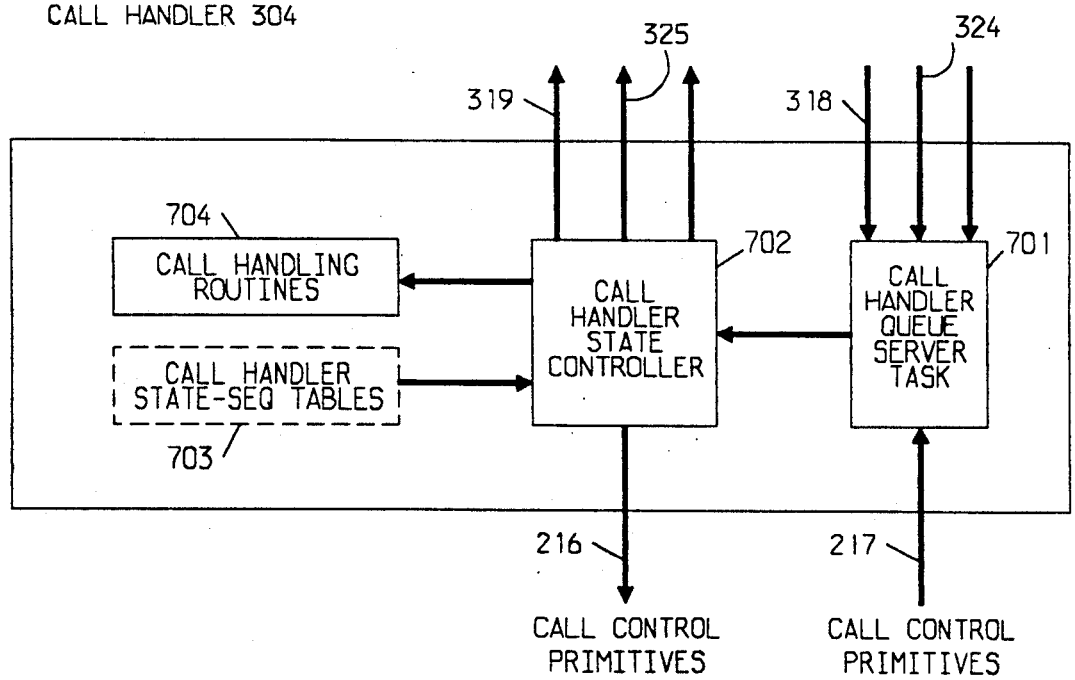
FIG. 7 illustrates, in block diagram form, call handling 304 of FIG. 3.

Call handler 304 is illustrated in greater detail in FIG. 7. Call handler queue server task 701 interrogates one of two queues for work. One queue is for messages from the Q.931 layer which are received from block 303, and the second queue is for higher layers which are blocks 305, 306, 307, and 312. If work is found in either of these queues, block 701 transfers the information along with the stimulus to call handler state controller 702. Controller 702 classifies the stimulus and information as being a maintenance or call type. Controller 702 sends the maintenance type which are restart requests and responses to maintenance block 312 for processing.

Calls are divided into four categories trunk, line, multilink, and nonswitched. Calls are placed in one of these categories based on the contents of the call record tables maintained by message processing block 303. If a call is the only call associated with a channel, it is assumed to be an ordinary telephone call or standard circuit switched call. If a call is one of plurality of calls on a channel, it is assumed to be a multilink call. If a call is not assigned to a channel, it is assumed to be a nonswitched call. Controller 702 processes each of these by using a separate set of state tables.

Standard circuit switched calls are processed to map the stimulus into the analog telephone and trunk format used by circuit call processing block 305, and that processed stimulus is then transferred to block 305. The multilink stimulus is processed and transferred to multilink block 306. The non-switched stimulus is processed and transferred to application manager 307 via path 325.

Circuit call processing block 305 is a well known circuit switched call processing as performed by customer communication switching systems, also referred to as a PBX or PABX. An example of such a system is the AT&T System 85.

Figure 8:
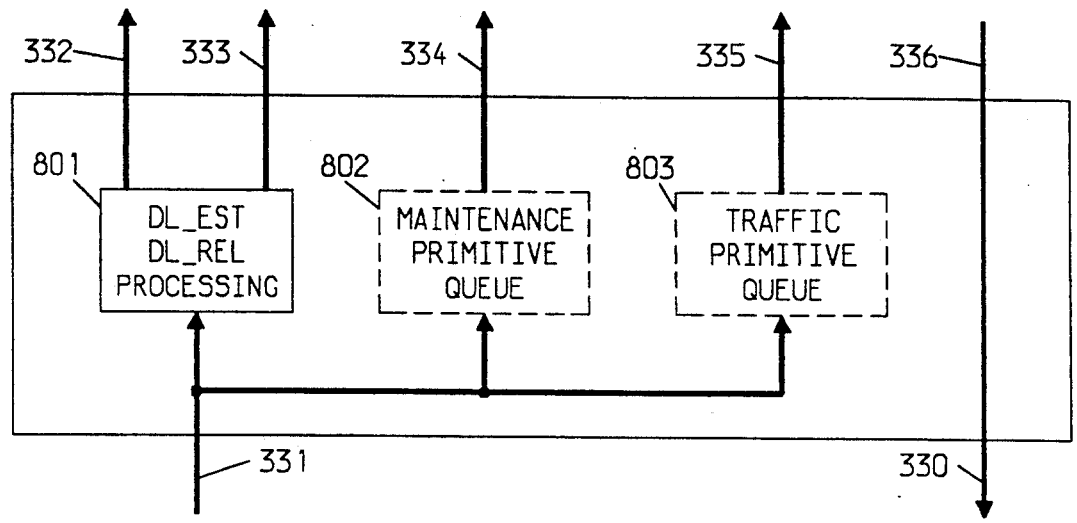
FIG. 8 illustrates, in block diagram form, L2-L3 primitive processing 309 of FIG. 3.

Other L2-L3 primitive processing block 309 is illustrated in greater detail in FIG. 8. Primitives received from block 301 by block 309 come either in the form of causing direct execution of processing routine 801 or the information is simply placed in buffers 802 and 803. If the information concerns the establishment or the release of a link, then block 301 causes routine 801 to process this information immediately and transmit the necessary stimulus to timing block 310 via path 332 and to resource management handler 311 via path 333. The reason for this quick response is that this information has to be acted on promptly by both resource management handler 311 and timing 310 in order to prevent disruption of system operation. If the primitive is destined to go to maintenance 312 or traffic 213, then this information can simply be placed in maintenance primitive queue 802 or traffic primitive queue 803, respectively, until the appropriate block can access this information and utilize it. All L2-L3 primitives coming from maintenance 312, resource management handler 311, or traffic 313 are transferred directly through block 309 to block 301 via paths 336 and 330.

Figure 9:
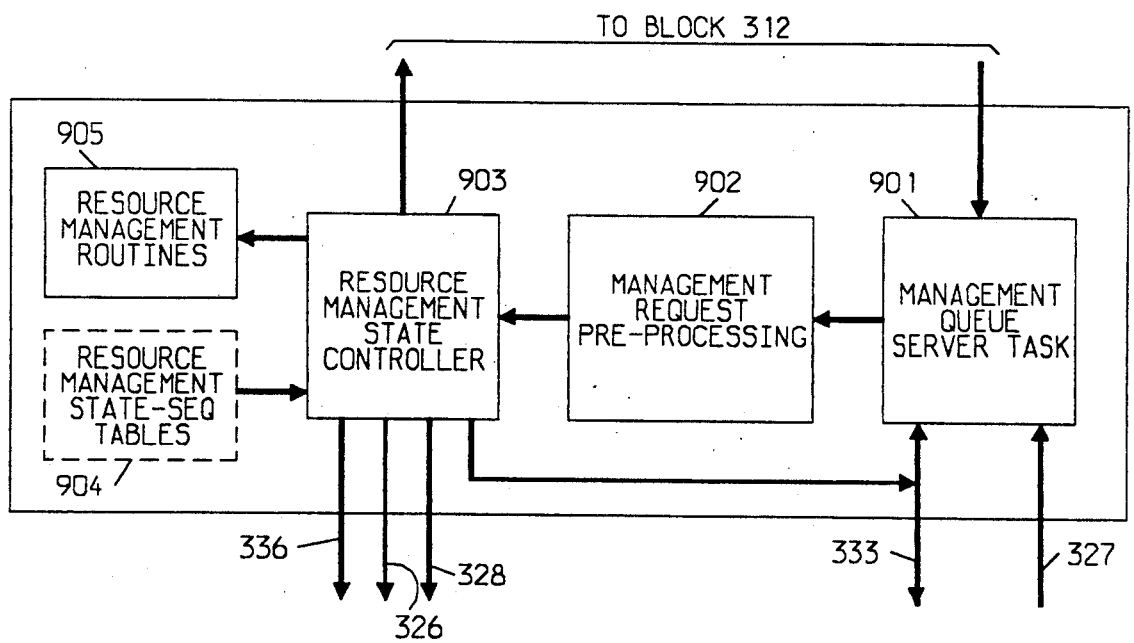
FIG. 9 illustrates, in block diagram form, resource management 311 of FIG. 3.

Resource management handler 311 is illustrated in greater detail in FIG. 9. Management queue server task 901 receives all information sent to block 311. Block 901 accepts either management requests from Q.931 message processing 303, via path 327, establish or release indications from L2-L3 primitive processing 309, or busy-out request from maintenance 312. Management queue server task 901 takes these requests and transfers them to management request preprocessing 902. The latter block determines the specific work to be done and turns the request into a stimulus that can be applied against state table 904 to determine the required actions in the form of a stimulus.

After accomplishing those functions, management request preprocessor 902 transfers the requires stimulus to resource management state controller 903. Controller 903 is responsive to the stimulus to use resource management state-sequence tables 904 and resource management routines 905 to process the stimulus. The output from controller 903 is either busy-out requests/responses passed to maintenance 312 or management primitives requesting that information be sent to the other side of the Q.931 interface. These management primitives are transmitted to Q.931 message processing 303 via path 327 if they refer to call information, otherwise they are transferred via L2-L3 primitive processing 309 via path 333.

Figure 10:
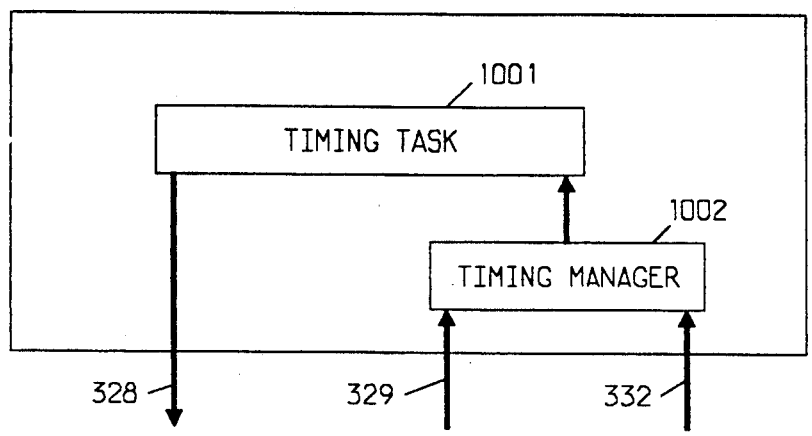
FIG. 10 illustrates, in block diagram form, timing 310 of FIG. 3.

FIG. 10 illustrates, in greater detail, timing 310. Timing 310 provides all of the timing for the Q.931 level messages and is responsive to two different types of requests. First, Q.931 message processing 303 uses timing 310 to enforce the various time intervals necessary for the Q.931 message states via paths 328 and 329. Second, timing 310 is responsive to the establishment and release primitives detected by L2-L3 primitive processing 309 to start the timer running so as to determine whether or not a link has been released or established within the proper time. If the necessary actions are not performed in the correct time interval, timing 310 then informs block 303, and the latter block takes the required actions. All requests to block 310 are received by timing manager 1002 via paths 329 and 332. Timing manager 1002 sets the necessary timing information in status memory to reflect what timers should be running. Timing task 1001 is executed every 100 milliseconds to determine when a timer expires. When a timer expires, timing task 1001 creates a timer expiration primitive and places it in a primitive queue for Q.931 message processing 303. Q.931 message processing 303 may in response to the timer expiration primitive transfer a message to resource management handler 311 via path 327.

FIG. 11 illustrates the format of the L2-L3 primitive packets. Field 1101 is used to communicate the scanner port number, and field 1102 contains the number of bytes in the packet. Field 1103 contains the L2-L3 primitive type. Field 1106 contains the necessary data. Fields 1104 and 1105 are the service access point identifier and terminal end point identifier, respectively. The terminal end point identifier allows for the specification of more than one end point for the message. The service access point identifier allows for more than one logical entity to be associated with a terminal end point identifier. More information concerning these fields can be found in the above referenced AT&T Technical Publication.

Figure 12:
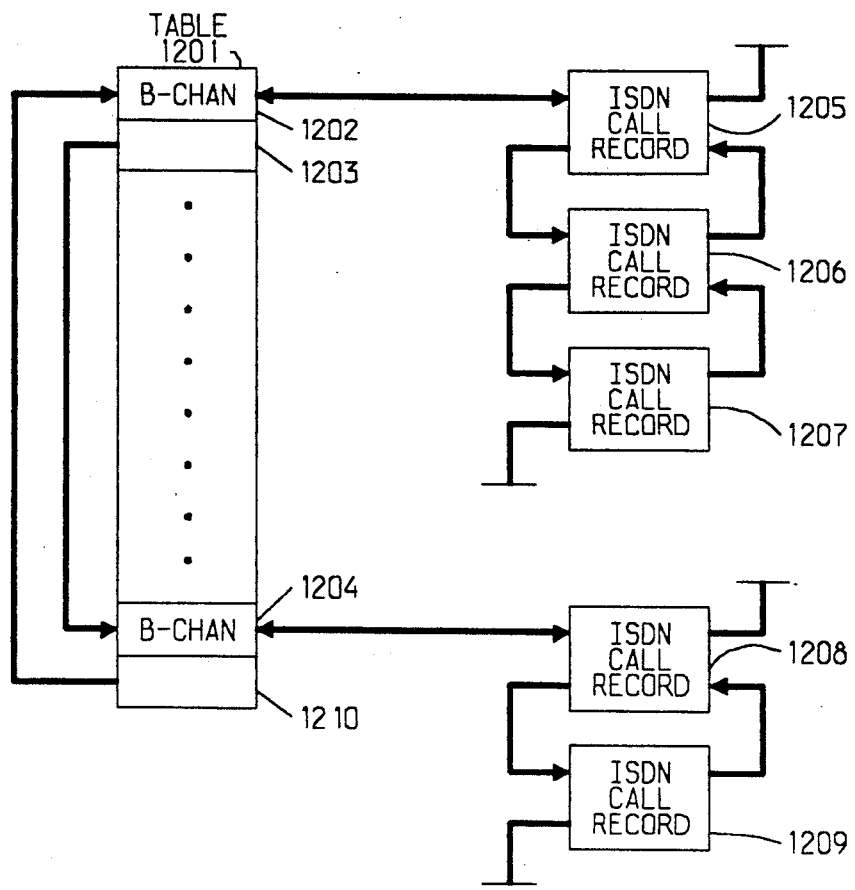
FIG. 12 illustrates, in block diagram form, linked ISDN call records.

FIG. 12 illustrates the table maintained by message processing block 303 which defines the level 3 links currently interconnected to a given module. Table 1201 has two entries for each B-channel in the system. The first entry in table 1201 points to a linked list of ISDN call records, and the second entry points to a second connected B-channel if the first B-channel is active. For example, entry 1202 points to the ISDN call record list that consists of records 1205, 1206, and 1207. The second entry, entry 1203, points to entries 1204 and 1210 which are associated with the connected B-channel. In the case where the B-channel was being utilized for only one switched call, the entry in table 1201 would only point to one ISDN call record. In the case illustrated by entry 1202, there are three associated ISDN call records; and these represent a multilink utilization of the channel associated with entries 1202 and 1203 of table 1201.

Figure 13:
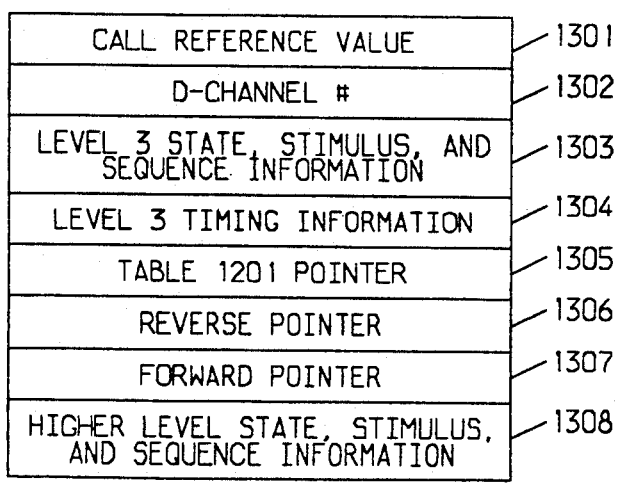
FIG. 13 illustrates the layout of a ISDN call record.

The structure of the ISDN call records is illustrated in greater detail in FIG. 13. Call reference value 1301 defines the number which is used to identify the data call between customer switching system 104 and another packet switch. D-channel number 1302 contains a pointer which points to the physical record of the D-channel which communicates signaling for the logical link assigned to the call record. Section 1303 of the call record defines the level 3 state, stimulus, and sequence information which is utilized by message processing block 303 of FIG. 3 to implement the level 3 protocol. Section 1304 contains the timers used at level 3 and the stimulus to be given when a timer times out. Section 1305 contains a pointer which points back to table 1201 from the call record in FIG. 12. Sections 1306 and 1307 are utilized to link a call record with other call records on the same logical channel. Section 1308 contains the high level state, stimulus, and sequence information which is utilized by blocks 304, and 306 in processing calls.

Figure 14:
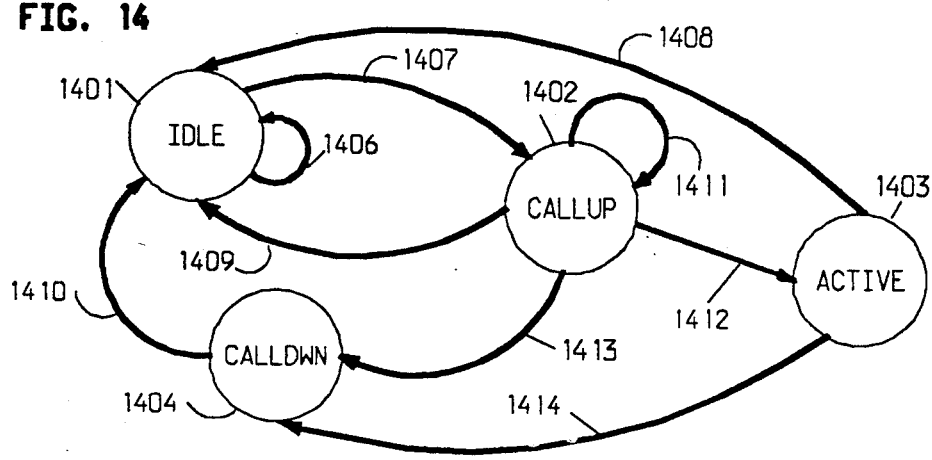
FIG. 14 illustrates the state diagram for a multiple link call.

FIG. 14 illustrates the state diagram for multilink calls which is implemented by multilink block 306 of FIG. 3. FIGS. 15 through 20 illustrate, in flowchart form, the functions executed by multilink block 306 to implement this state diagram. A data call has two halves, and block 306 implements both halves. Messages between two halves of the same call are communicated within block 306. Call handler 304 of FIG. 3 makes the determination of whether a call is a circuit switched or a packet call. Call handler 304 makes that determination on whether there is already a call record associated with a logical channel when a call request is received on that logical channel. If there is already one call record, block 304 assumes this is a multilink call and passes it to block 306. If there are no other call records, block 304 passes it to block 305. This results in block 305 setting up the first link of a multilink call. In addition, block 304 ascertains that the required outgoing logical link is in a logical channel interconnected to the logical channel on which a second call request to establish a logical link was received.

Figure 15:
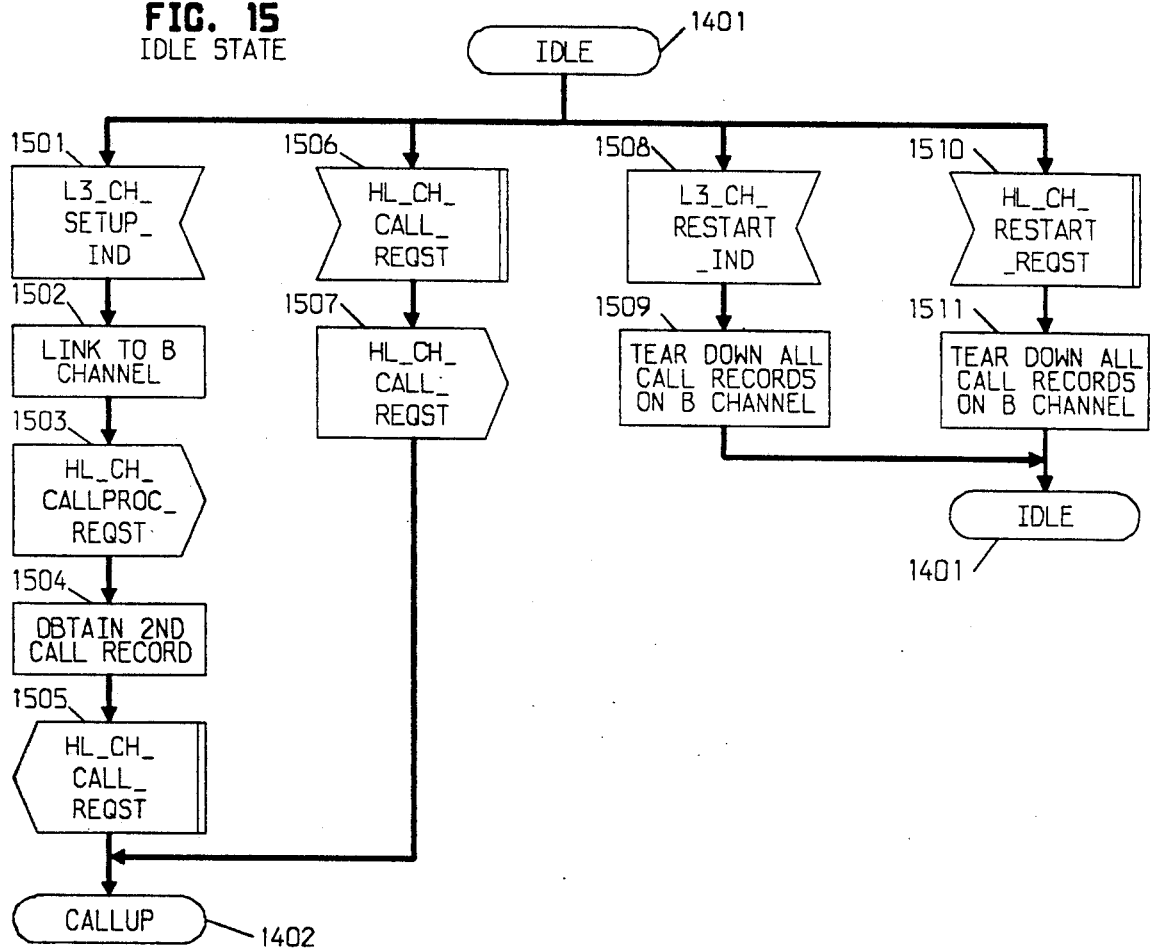
FIG. 15 illustrates, in flowchart form, idle state 1401 of FIG. 14.

FIG. 15 illustrates the messages which cause a call to move from idle state 1401. FIG. 15 illustrates four ways in which the call can be moved from the idle state 1401. The first of these is in response to a request to setup a logical link message which is handled by block 1501. This message comes from block 303 through call handler 304. In response to this request, block 1502 is executed which causes an ISDN call record to be added into the linked list for the particular logical channel, also commonly referred to as a B-channel, associated with the setup message received in block 1501. In the present example, it results in call record 1207 of FIG. 12 which is associated with logical channel 108 being linked into call record 1206. It is important to remember that the first link to be set up on the channel actually was set up via the circuit call processing block 305. This happened since the call handler was not aware that the first link was part of a multilink call. After the call record 1207 has been linked into call record 1206, block 1503 is utilized to transmit a message to processing block 303 via block 304 indicating that the request is valid and that the request is being processed. This message will be transmitted back to packet switch 101.

Next, block 1504 is executed which obtains B-channel index 1204 for logical channel 110. This identification of the connecting logical channel is performed by using entry 1203 which points to B-channel index 1204. Entries 1203 and 1210 were initialized by block 305 of FIG. 3 when the first logical link was setup. Once B-channel index 1204 is identified in block 1504, call record 1209 is created and linked to call record 1208. This results in the second half of the call being placed in idle state 1401 of FIG. 14. Block 1505 transmits a call request message to the second half of the call. The first half of the call which is represented by call record 1207 then is transferred to the callup state 1402 by exit block 1502. The second half of the call which is represented by call record block 1209 is in idle state 1401 and is moved from the idle state to the callup state 1402 by the executions of blocks 1506 and 1507. Block 1506 is the response to the stimulus of the call request message from block 1505. In response to this stimulus, block 1507 transmits a message to block 303 via block 304 resulting in a message being transmitted to the packet switch 102 to establish a link for this second half of the call. Then, the second half of the call enters callup state 1402 via exit block 1402.

Entry blocks 1508 and 1509 respond to global type messages. For every logical channel, there is a global call record which is always considered to be in idle state 1401. When a packet switch removes all links from a logical channel, a message is transmitted which is received by blocks 301 through 303 and results in the restart indication message as indicated by 1508 being received by block 306 via block 304. In response to this message, block 1509 removes all call records such as call records 1205 through 1207 associated with logical channel 108 of the present example. Similarly, blocks 1510 and 1511 respond to the stimulus illustrated in block 1510 which is a restart request from a higher level. For example, this request could come from maintenance block 312 when the maintenance block determined that it is necessary to restart a particular logical channel. When the high level restart request is received, block 1511 functions similarly to block 1509 and removes all the call records from the specified logical channel.

Figure 16:
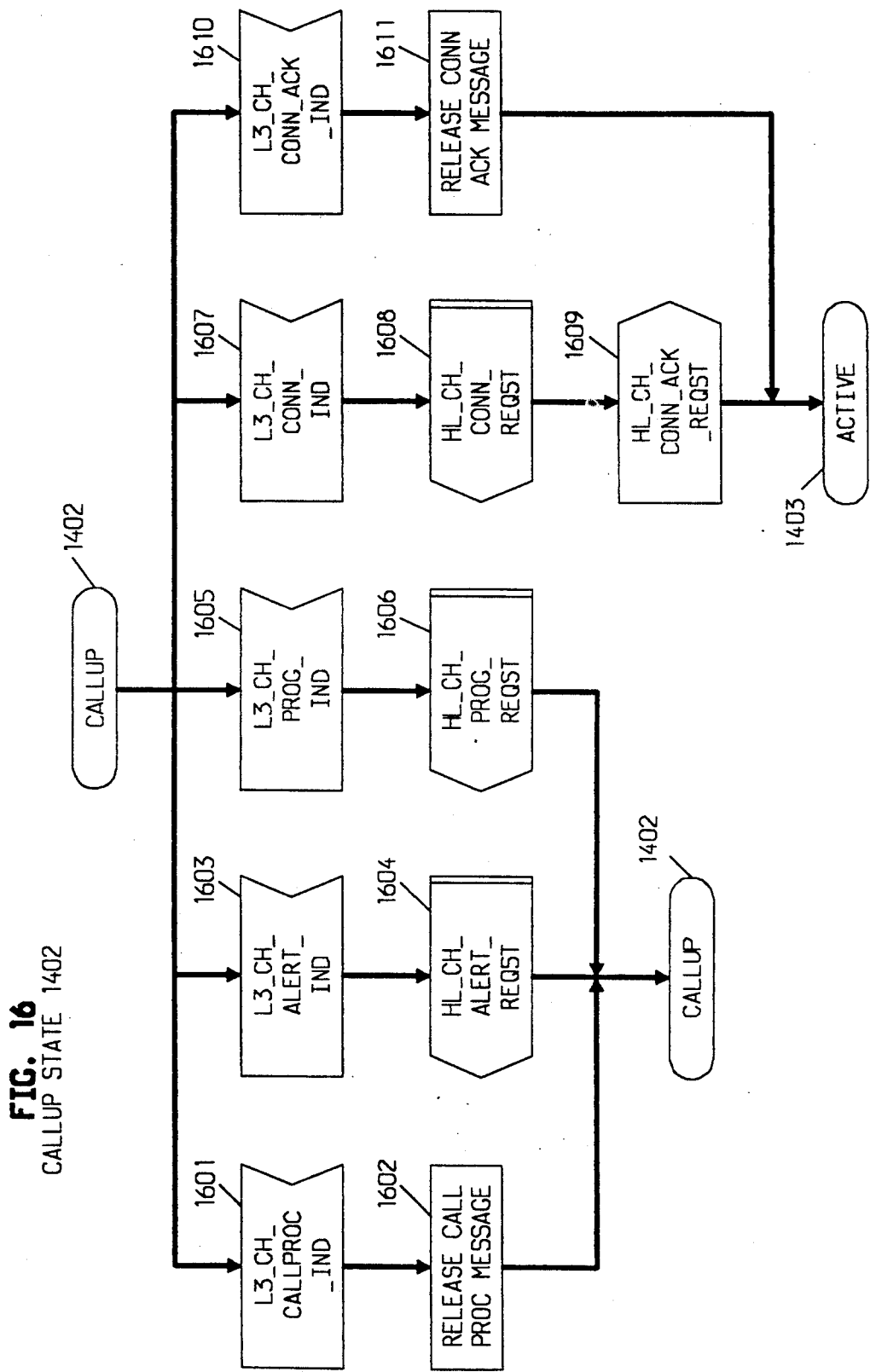
FIGS. 16, 17, and 18 illustrate, in flowchart form, callup state 1402 of FIG. 14.
Figure 17:
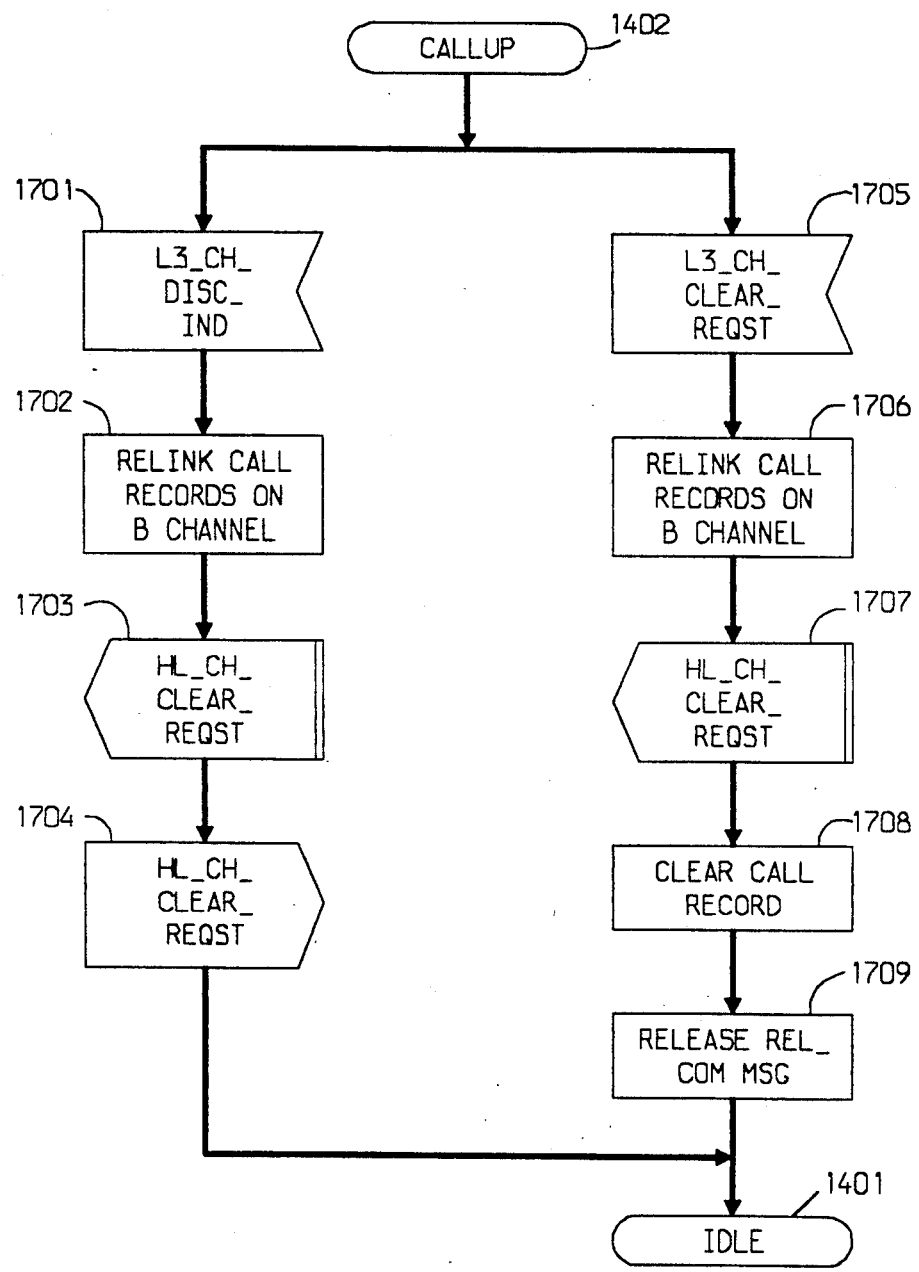
Figure 18:
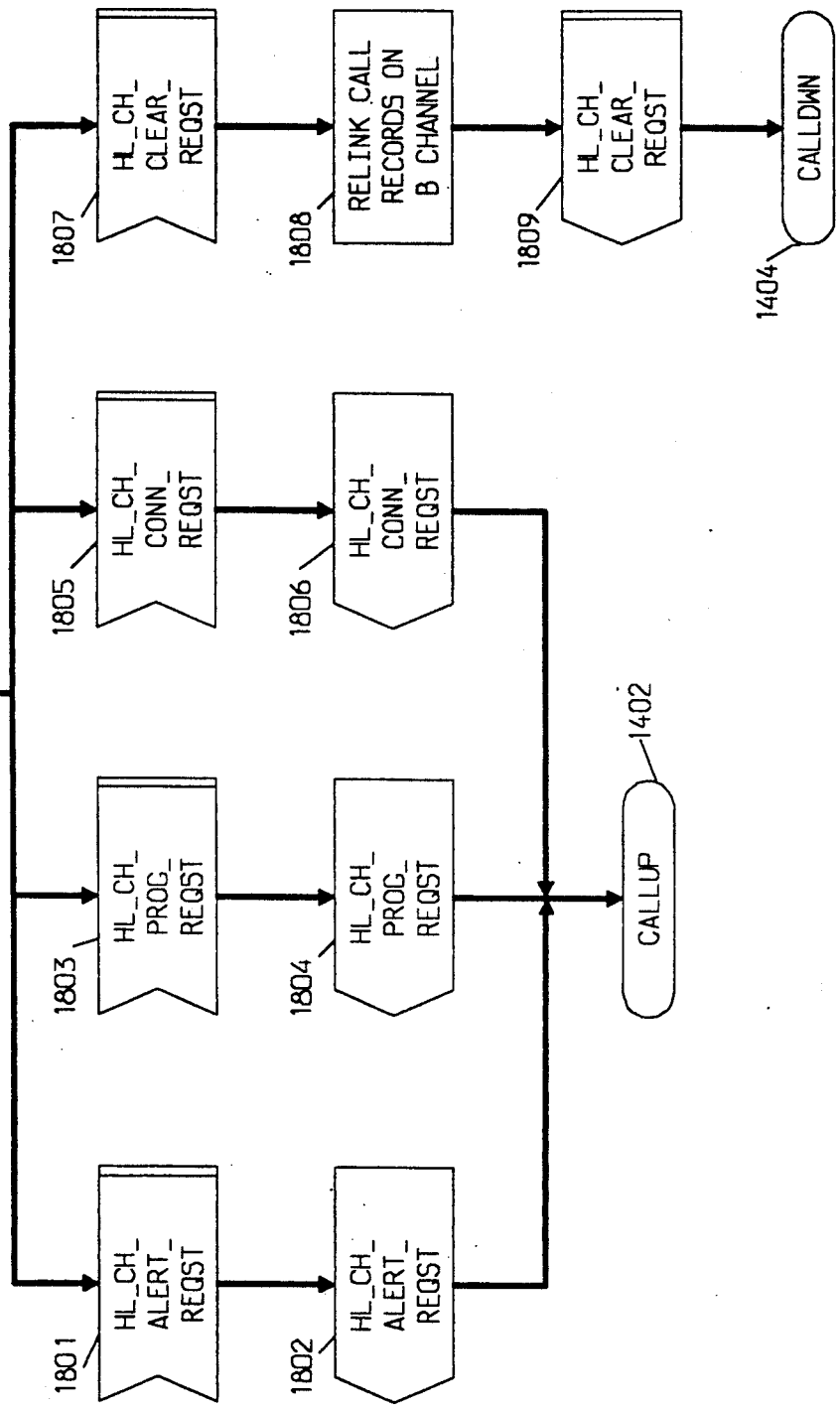

FIGS. 16 through 18 illustrated, in greater detail, callup state 1402 of FIG. 14. Callup state 1402 is only entered from idle state 1401. Entry block 1601 of FIG. 16 indicates a response back from packet switch 102 for the message which was transmitted in block 1507 of FIG. 15. Customer switching system 104 was waiting for that response. After transmitting that message, customer switching system 104 had stored an indication of transmission of that message so that if no response was received back within a predetermined amount of time the message would be retransmitted to packet switch 102. When the response is received back from packet switch 102 as indicated by entry block 1601, block 1602 releases the indication that a response was needed, and the call remains in the callup state 1402. Note, that block 1601 deals with the second half of the call. When packet switch 102 alerts terminal 105 that a data call is being set up for it, packet switch 102 informs customer switching system 104 of this fact by the transmission of an alert indication message. That message is received by the second half of the call in entry block 1602. In block 1604, an alert request is generated which is transmitted to the first half of the call which is interconnected by logical channel 108 to packet switch 101. The message generated in block 1604 is handled by the first half of the call by entry block 1801 of FIG. 18. In response to this signal, block 1802 generates an alert request primitive which flows through call handler block 304, message processing block 303, message handling block 302 and message I/O block 301 (level 3 processing) resulting in a message being transmitted to packet switch 101 via the D-channel associated with logical channel 108 indicating that terminal 105 has been alerted.

During callup state 1402, the packet switches and customer switching system 104 can exchange a variety of messages which indicate various types of call progress indication. In the present example, one type of progress indication is if packet switch 102 had to leave the ISDN network in order to complete the packet call, for example, via a modem. If this occurs, packet switch 102 indicates this fact by transmitting a message which will eventually reach terminal 118 via customer switching system 104 and packet switch 101. Packet switch 102 transmits this progress indication message via the D-channel associated with logical channel 110, and it is received by the second half of the call in customer switching system 104 by entry block 1605 after being processed by block 303 via block 304. In response to this message, block 1606 is executed which causes the indication to be transferred to the first half of the call by the transmission of a progress request message. The entry point in the first half of the call for a progress request message is entry block 1803 of FIG. 18. In response to this latter message, block 1804 transmits a progress request down to message processing block 303 via block 304 which results in a progress indication message being transmitted to packet switch 101 and from there to terminal 118.

When packet switch 102 determines that terminal 105 has answered the data call, it transits a connection indication message via the D-channel associated with channel 110 to customer switching system 104 which results in a primitive being generated at level 3 which is received by entry block 1607 of FIG. 16. In response to this connection indication message, block 1608 transmits to the first half of the call a connection request message which is handled by block 1805 of FIG. 18. Block 1609 transmits a connection acknowledge request to level 3 which results in a connection acknowledge message being transmitted to packet switch 102. The second half of the call then enters active state 1403.

The message generated by block 1608 of FIG. 16 is transferred internally within block 306 of FIG. 3 and is subsequently communicated to entry block 1805 of FIG. 18. Block 1806 is responsive to this connection request to send a connection indication message to level 3 which results in a connection indication message being transmitted to packet switch 101. At this point, the first half of the call is waiting for a connection acknowledgement indication to be received back from packet switch 101. This connection acknowledgment indication is handled by entry block 1610 and results in the release of the connection acknowledgement indication which was received from level 3. After execution of block 1611, the first half of the call enters active state 1403.

During callup state 1402, either packet switch can initiate a disconnect. There are two exits from callup state 1402 in response to a disconnect which are to exit to idle state 1401 or to calldown state 1404. The exit taken depends on whether the first or the second half of the call receives the initial disconnect from the packet switch. If, for example, packet switch 101 is the originator of the disconnect procedure, then customer switching system 104 can simply respond to this indication and enter idle state 1401 for the first half of the call after indicating that a disconnect is taking place to the second half of the call. The second half of the call, however, must go to calldown state 1402 because it has to inform packet switch 102 and wait until packet switch 102 responds to this disconnect indication. For example, the disconnect message from packet switch 101 is received via the D-channel associated with logical channel 108 and results in a primitive being received from level 3 in entry block 1701 of FIG. 17. Block 1702 relinks the call records associated with logical channel 108 to remove the first half of the call. In addition, a primitive is generated in block 1703 and communicated with block 306 to the second half of the call and is handled by block 1807 of FIG. 18. In addition, block 1704 generates a primitive which goes via call handler 304 down to level 3 which sends a clear request back to packet switch 101 via the D-channel associated with logical channel 108. The primitive generate by block 1703 is handled in the second half of the call by block 1807 of FIG. 18. Block 1808 performs the same relinking of its call records as block 1702 to eliminate the call in block 1808. In addition, block 1809 is executed to transmit a clear request down to level 3 which results in a clear request message being sent to packet switch 102. Finally, the exit is made to calldown state 1404 via block 1809. When packet switch 102 receives the clear request message, it transmits a message which results in level 3 generating a clear request that is received by entry block 2001 of FIG. 20 in the calldown state 1404. Blocks 2002 and 2003 free up memory which have been associated with the call, and the call returns to the idle state 1401.

During call state 1402, another way that the process of setting up the call can be aborted in addition to the transmission of the disconnection indication is by the transmission of the clear request. The latter request can be generated when an error occurs and the level 3 processing in customer switching system 104 and the level 3 processing in packet switch 101 or 102 determine that they are no longer in synchronization with respect to the proper state for level 3. If this is determined by packet switch 102, for example, it transmits a clear request to customer switching system 104. The clear request is handled by entry block 1705 of FIG. 17. Block 1706 performs the relinking of the call records in order to eliminate the call and its associated logical link. Block 1707 transmits a clear request primitive which is internally communicated by block 306 to the second half of the call which proceeds to disconnect the call in the normal manner. This primitive is handled by block 1807 of FIG. 18 whose function has already been described. Blocks 1708 and 1709 release all of the memory which had been associated with the call. Block 1709 also transfers the call into idle state 1401.

Figure 19:
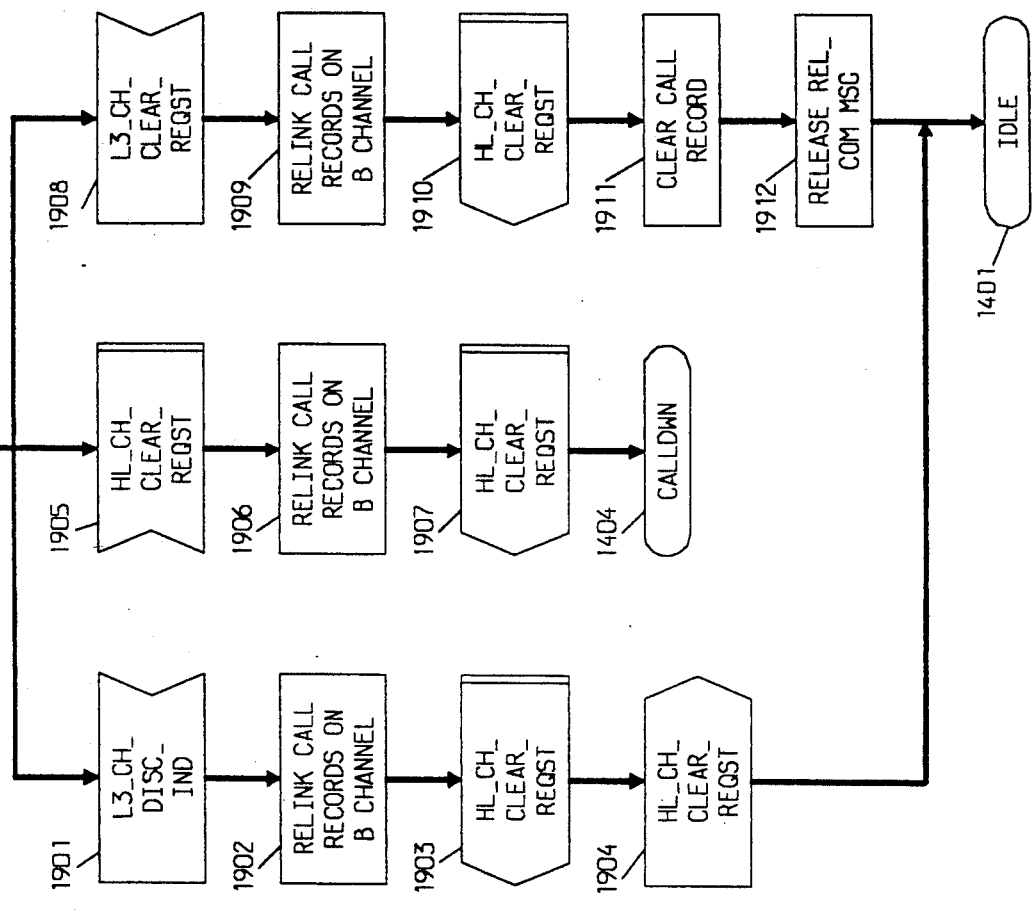
FIG. 19 illustrates, in flowchart form, active state 1403 of FIG. 14.
Figure 20:
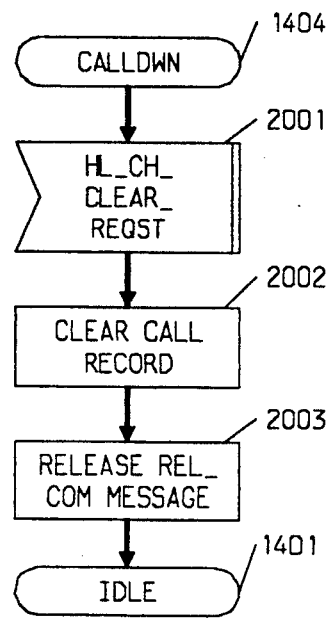
FIG. 20 illustrates, in flowchart form, calldown state 1404 of FIG. 14.

FIG. 19 shows the actions performed in active state 1403. The functions performed in blocks 1901 through 1904 are identical to those performed by blocks 1701 through 1704 of FIG. 17. The functions performed by blocks 1908 through 1912 are identical to those performed by blocks 1705 through 1709 of FIG. 17. The functions performed by blocks 1905 through 1907 are identical to those performed by blocks 1807 through 1809 of FIG. 18.

Figure 21:
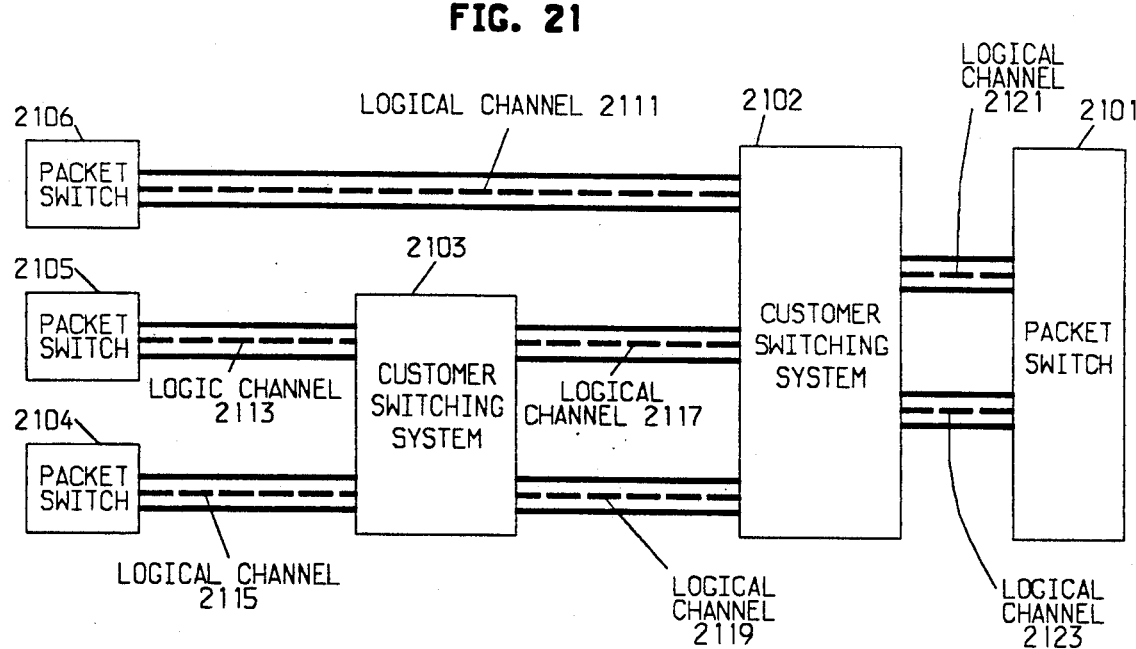
FIG. 21 illustrates, in block form, multiple circuit switching system interconnecting logical links between packet switching systems.

FIG. 21 illustrates packet switches 2101 and 2104 through 2106 interconnected by customer switching systems 2102 and 2103. As illustrated, logical channel 2121 is interconnected via customer switching system 2102 to logical channel 2117 and logical channel 2113 is interconnected via customer switching system 2103 to logical channel 2117. Logical channel 2123 is interconnected to logical channel 2119 via customer switching system 2102 and logical channel 2119 is interconnected to logical channel 2115 via customer switching system 2103. Packet switch 2101 can communicate packets via logical links to packet switch 2105 over logical channels 2121, 2117, and 2113 and packets via logical links to packet switch 2104 via logical channel 2123, 2119, and 2115. Customer switching systems 2102 and 2103 function similarly to customer switching system 104 of FIG. 1.

It is to be understood that the above-described embodiment is merely illustrative of the principles of the invention and that other arrangements may be devised by those skilled in the art without departing from the spirit and scope of the invention.

We claim:

1. A circuit switching system interconnected to at least one of a plurality of types of end point systems by a plurality of communication facilities for establishing logical calls in logical channels in said plurality of communication facilities between at least one of said plurality of types of end point systems to communicate logical calls between at least one of said plurality of types of end point systems, comprising:

means responsive to a first setup request from a first one of said one of said plurality of types of endpoint systems for a logical call to a second one of said one of said plurality of types of end point systems received via a first logical channel for connecting said first logical channel from said first one of said one of said plurality of types of endpoint systems to a second logical channel from said second one of said one of said plurality of types of endpoint systems with said logical call being communicated on said first and second logical channels;

said connecting means further responsive to a second setup request from said first one of said one of said plurality of types of endpoint systems received via said first logical channel to said second end of said one of said plurality of types of end point systems for signaling said latter one of said one of said plurality of types of end point systems that communication is to be established for another logical call via said second logical channel from said second one of said one of said plurality of types of end point systems with said other logical call also being communicated on said first and second logical channels; and said connecting means further responsive to a third setup request received via said first logical channel from said first one of said one of said plurality of types of end point systems for a logical call to a third one of said one of said plurality of types of end point systems for denying said third setup request.

2. The circuit switching system of claim 1 wherein a first type of said plurality of end point systems are packet switching networks;

a second type of said plurality of end point systems are voice concentrators; and a third type of said plurality of end point systems are data multiplexers.

3. The circuit switching system of claim 1 further comprising means responsive to the denied third setup request for negotiating a third logical channel to service said third setup request.

4. The circuit switching system of claim 1 further comprising a plurality of circuit switching networks each responsive to said first setup request for sequentially establishing logical channels for said plurality of types of end point systems.

5. A circuit switching system interconnected to a plurality of packet capable end point systems by a plurality of communication facilities for establishing logical links in logical channels in said plurality of communication facilities between said plurality of packet capable end point systems to communicate packets between said plurality of packet capable end point systems, comprising:

means responsive to a first setup request from a first one of said plurality of packet capable end point systems to establish a logical link to a second one of said plurality of packet capable end point systems received via a first logical channel for connecting said logical channel from said first one of said plurality of packet capable end point systems to a second logical channel from said second one of said plurality of packet capable end point systems with said logical link being established on said first and second logical channels;

said connecting means further responsive to a second setup request from said first one of said plurality of packet capable end point systems received via said first logical channel to said second one of said packet capable end point systems for signaling said second one of packet capable end point systems that communication is to be established for another logical link via said second logical channel from said second one of said plurality of packet capable end point systems and via said first logical channel from said first one of said plurality of packet capable end point systems;

said connecting means further responsive to a third setup request received via said first logical channel from said first one of said plurality of packet capable end point systems for a logical link to a third one of said plurality of packet capable end point systems for denying said third setup request.

6. The circuit switching system of claim 5 wherein each of said plurality of packet capable end point systems is a packet switching network.

7. The circuit switching system of claim 5 further comprising means responsive to the denied third setup request for negotiating third logical channel to service said third setup request.

8. The circuit switching system of claim 5 further comprising a plurality of circuit switching networks each responsive to said first setup request for sequentially establishing logical channels for said first one of said plurality of packet capable end point systems.

9. A circuit switching system interconnected to a plurality of packet switching networks by a plurality of trunks for establishing logical links on logical channels communicated on said plurality of trunks in response to setup requests using a packet protocol from said plurality of packet switching networks to interconnect said plurality of packet switching networks, comprising:

means responsive to said setup requests from said plurality of packet switching networks with each setup request requesting a logical link on a logical channel for interpreting the packet protocol of each setup request to obtain destination information;

means responsive to the destination information of a first interpreted setup request from a first one of said plurality of trunks interconnected to a first one of said plurality of packet switching networks designating a second one of said plurality of packet switching networks for connecting a first logical channel of said first one of said plurality of trunks to a first logical channel of a second one of plurality of trunks interconnected to said second one of said plurality of packet switching networks;

means responsive to the connection of said first logical channel of said first one of said plurality of trunks to said first logical channel of said second one of said plurality of trunks for signaling said first and second ones of said plurality of packet switching networks using said packet protocol that a logical link of said first logical channels of said first and second ones of said plurality of trunks is to be selected for communication;

said connecting means comprises means responsive to destination information also designating said second one of said plurality of packet switching networks of a second interpreted setup request for a second logical link on said first logical channel of said first one of said plurality of trunks to said second one of said plurality of packet switching networks from said first one of said plurality of packet switching networks for indicating that another logical link is to be selected from said first logical channels of said first and second ones of said plurality of trunks for communication between said first and second ones of said plurality of packet switching networks; and said signaling means further responsive to said indicating means for signaling said first and second ones of said plurality of packet switching networks using said packet protocol that said other logical link of said first logical channels of said first and second ones of said plurality of trunks is to be selected for communication.

10. The circuit switching system of claim 9 wherein said connecting means comprises means responsive to destination information of a third interpreting setup request from said first one of said plurality of packet switching networks via said first one of said plurality of trunks specifying a third one of said plurality of packet switching networks for denying said third interpreted setup request.

11. The circuit switching system of claim 10 wherein said connecting means further responsive to said third interpreted setup request from said first one of said plurality of packet switching networks via a second logical channel of said first one of plurality of trunks for connecting said second logical channel of said first one of said plurality of trunks to a first logical channel of a fourth one of said plurality of trunks interconnected to said third one of said plurality of packet switching networks.

12. The circuit switching system of claim 11 further comprises a first and second circuit switching networks interconnected by another plurality of trunks and said interpreting means comprises a first interpreting means responsive to setup requests including destination information received by said first circuit switching network for interpreting such setup requests for use in said first circuit switching networks and a second interpreting means responsive to setup requests including destination information received by said second circuit switching network for interpreting such setup requests for use in said second circuit switching network;

said connecting means comprises a first connecting means responsive to said first interpreting means interpreting the destination information for connecting logical channels in said first circuit switching network and second connecting means in response to said second interpreting means interpreting the destination information for connecting logical channels in said second circuit switching network; and said signaling means comprises a first signaling means responsive to connection of logical channels in said first circuit switching network for signaling on said other plurality of trunks and a second signaling means responsive to connection of logical channels in said second circuit switching network for signaling on said plurality of trunks.

13. The circuit switching system of claim 12 wherein said first connecting means is responsive to said destination information of said first interpreted setup request for connecting said first logical channel of said first one of said plurality of trunks to a first logical channel of a first one of said other plurality of trunks;

said first signaling means responsive to the connection of said first logical channel of said first one of said plurality of trunks to said first logical channel of said first one of said other plurality of trunks for signaling said second circuit switching network that a logical link of said first logical chanel of said first one of said plurality of trunks is to be selected for communication by retransmission of said first interpreted setup request to said second one of said circuit switching networks;

said second interpreting means responsive to the retransmitted first interpreted setup request for interpreting said destination information;

said second connecting means responsive to said destination information of the interpreted retransmitted first interpreted setup request for connecting said first logical channel of said second one of said plurality of trunks;

said second signaling means responsive to the connection between said first logical channel of said first one of said other plurality of trunks to said first logical channel of said second one of said plurality of trunks for signaling said second one of said plurality of packet switching networks by retransmission of said first interpreted setup request.

14. A method for interconnecting a plurality of packet capable end points connected by a plurality of communication facilities to a circuit switching system by establishing logical links in logical channels in said plurality of communication facilities between said plurality of packet capable end points to communicate packets between said plurality of packet capable end points via said circuit switching system, said method comprising the steps of:

connecting, in response to a first setup request from a first one of said packet capable end points to establish a logical link to a second one of said packet capable end points received via a first logical channel, said first logical channel from said first one of said plurality of packet capable end points to a second logical channel from said second one of said packet capable end points with said logical link being established on said first and second logical channels;

signaling, in response to a second setup request from said first one of said packet capable end points received via said first logical channel to said second one of said packet capable end points, said latter one of said packet capable end points that communication is to be established for another logical link via said second logical channel from said second one of said packet capable end points and said first logical channel from said first one of said plurality of packet capable end point systems;

denying, in response to a third setup request received via said first logical channel from said first one of said plurality of packet capable end points for a logical link to a third one of said plurality of packet capable end points, said third setup request.

15. The method of claim 14 wherein each of said plurality of packet capable end points is a packet switching network.

16. The method of claim 14 further comprising the step of negotiating a third logical channel to service said third setup request in response to the denied third setup request.

17. The method of claim 14 wherein said circuit switching system comprises a plurality of circuit switching networks, said method further comprises the step of sequentially establishing logical channels through said plurality of circuit switching networks for said first one of said plurality of packet capable end points.

* * * * *